United States Patent [19]
Myers

[11] 4,157,582
[45] Jun. 5, 1979

[54] PLUG-IN CONTACT STRUCTURE FOR PANELBOARD

[75] Inventor: Felix E. Myers, Cherry Hill, N.J.
[73] Assignee: Gould Inc., Rolling Meadows, Ill.
[21] Appl. No.: 879,624
[22] Filed: Feb. 21, 1978
[51] Int. Cl.² ............................................. H02B 1/04
[52] U.S. Cl. .................................... 361/353; 361/355; 339/22 B
[58] Field of Search .................... 174/72 B; 339/22 B, 339/32 R, 32 M, 33; 361/346, 353, 354, 355

[56] References Cited

U.S. PATENT DOCUMENTS

| | | | |
|---|---|---|---|
| 3,095,524 | 6/1963 | Leonard | 361/353 |
| 3,263,132 | 7/1966 | Bangert, Jr. | 361/354 |
| 3,309,581 | 3/1967 | Klein | 361/354 |
| 3,402,328 | 9/1968 | Gryctko | 361/354 |

Primary Examiner—Gerald P. Tolin
Attorney, Agent, or Firm—Ostrolenk, Faber, Gerb & Soffen

[57] ABSTRACT

A plug-in contact structure for a panelboard which mounts both half and one inch wide circuit breakers includes a plurality of bus bars each having a plurality of integrally formed contact sections spaced along the length of the bars. The contact sections are interleaved in a phased sequence array and each contact section includes only two contact blades. All blades are aligned in a row with the plane of each blade being perpendicular to the length of the row and being disposed from each other by a half inch.

7 Claims, 6 Drawing Figures

PLUG-IN CONTACT STRUCTURE FOR PANELBOARD

Molded case circuit breakers for domestic and light industrial applications are, for the most part, mechanically and electrically secured at their line ends by plug-in contact means which engages cooperating plug-in contact means of a panelboard. Such circuit breakers are constructed as single pole modules which come in narrow and wide versions with the latter being typically one inch wide and the former being one half inch wide.

In order to economize on space in a panelboard and at the same time maintain flexibility, the prior art has provided panelboard constructions in which the same plug in location is capable of accepting either wide or narrow circuit breakers. Early examples showing such arrangements are found in U.S. Pat. No. 3,403,301 issued Sept. 24, 1968 to J. J. Mrowka et al for an Electric Circuit Control Device Panel Board And Assembly, and in U.S. Pat. No. 3,412,291 issued Nov. 19, 1968 to K. J. Stokes for a Panelboard Having Multibladed Contacts. Both of these examples of the prior art were costly to produce in that certain of the contact blade elements were not formed integrally with a bus bar, thereby necessitating an assembly operation utilizing small parts.

A more recent example of the prior art, shown in U.S. Pat. No. 4,002,388 issued Jan. 11, 1977 to G. A. Menocal for a Stab Arrangement For Busbars, is a contruction in which all of the contact blades are formed integrally with a bus bar. However, the construction shown in the aforesaid U.S. Pat. No. 4,002,388 is also costly in that it requires many bends to be made in different directions. Further, in the prior art as typified by the three aforesaid patents, the narrow breakers did not utilize the same plug-in blades used by the wide breakers.

The instant invention overcomes the difficulties of the prior art as noted above by providing a panelboard for half inch and one inch breakers in which the same plug-in blades are used for both types of breakers and in which the blades are formed integrally with a bus bar.

Accordingly, a primary object of the instant invention is to provide a novel construction for the main conductor assembly of a panelboard which will accomodate both one inch and one half inch wide molded case circuit breakers.

Another object is to provide a main conductor assembly of this type which is economical to produce.

Still another object is to provide a main conductor assembly of this type in which the same plug-in contact blades are used for connection by both one inch and one half inch wide breakers.

A further object is to provide a main conductor assembly of this type in which all of the contact blades are formed integrally with a bus bar.

These objects as well as other objects of this invention shall become readily apparent after reading the following description of the accompanying drawings in which.

Figure 1:
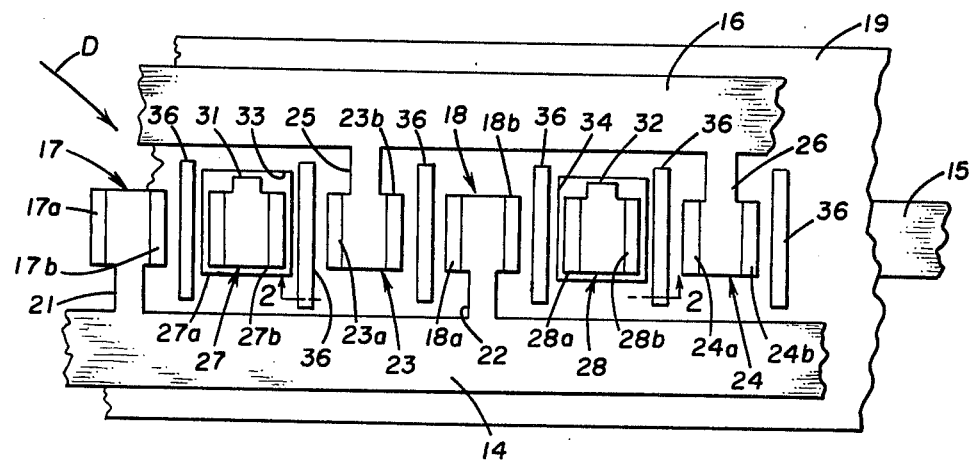
FIG. 1 is a fragmentary plan view of a three phase main conductor assembly constructed in accordance with teachings of the instant invention.
Figure 4:
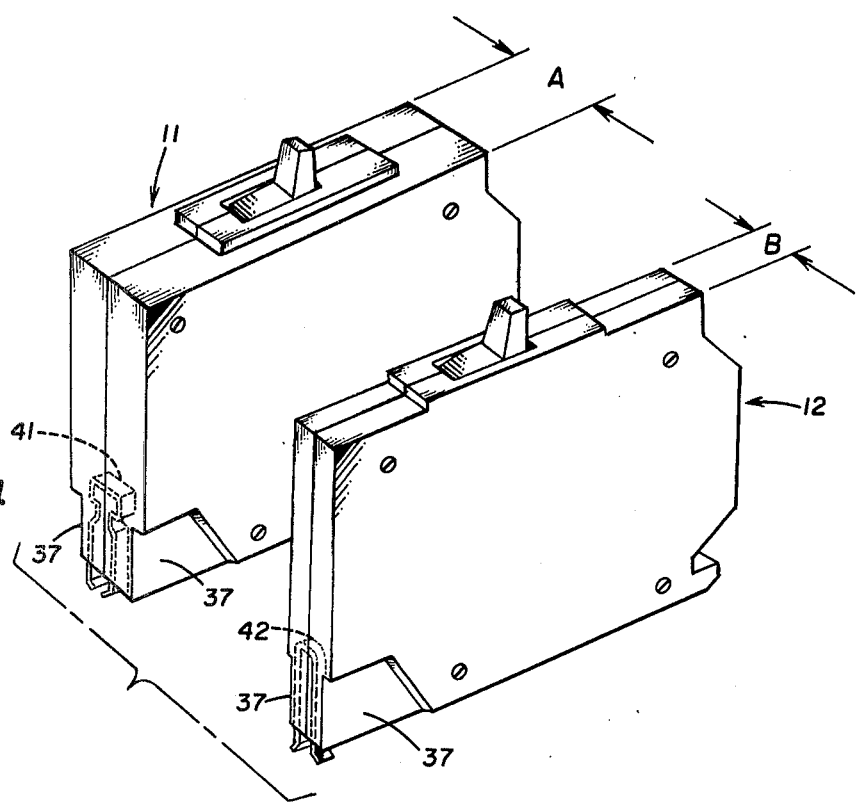
FIG. 4 is a perspective of a one inch wide circuit breaker and a half inch wide circuit breaker constructed for cooperation with the main conductor assembly of FIG. 1.
Figure 2:
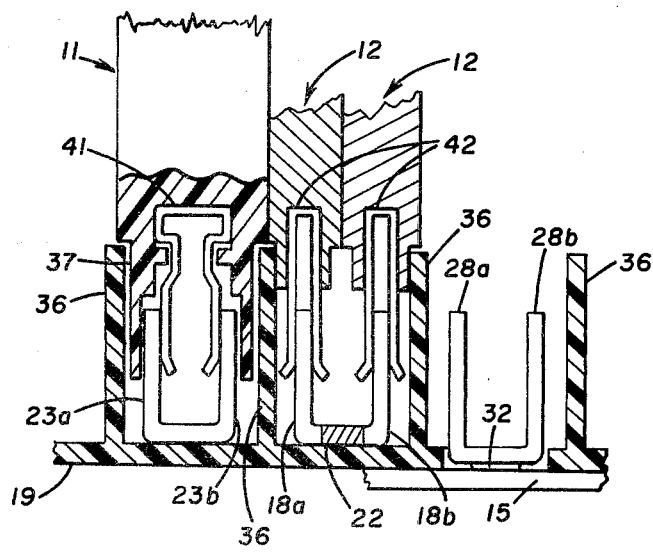
FIG. 2 is a cross-section taken through line 2—2 of FIG. 1 looking in the direction of arrows 2—2, with circuit breakers shown mounted to the main conductor assembly.
Figure 3:
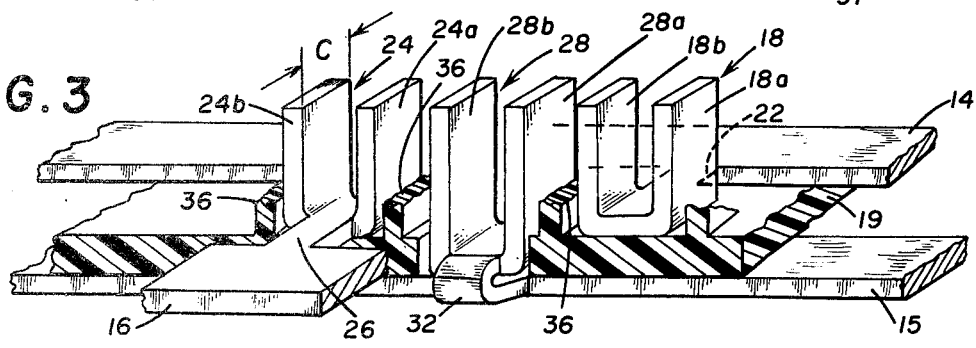
FIG. 3 is a fragmentary perspective looking in the direction of arrow D of FIG. 1.

Now referring to the drawings and more particularly to FIGS. 1 through 3 which illustrate the main conductor assembly for a three phase panelboard constructed, pursuant to the instant invention, to receive a plurality of both circuit breakers 11 and 12 of FIG. 4. In a manner well known to the art the outlines of circuit breaker modules 11 and 12 are, in side elevation, generally the same. However, the width A of module 11 is approximately twice the width B of module 12. Typically, A equals one inch.

More particularly, the main conductor means of FIGS. 1–3 includes flat parallel conductors 14, 15 and 16 insulated from each other and connected to different phases of a three phase source (not shown). Outer bus bars 14, 16 sit on the forward surface of insulator 19. Bar 14 is provided with a plurality of integrally formed equally spaced contact sections, only two of which 17, 18 are shown. Sections 17, 18 are laterally offset from the longitudinal axis of bus bar 14 and are connected thereto by respective joining sections 21, 22. Similarly bar 16 is provided with a plurality of integrally formed equally spaced contact sections, only two of which 23, 24 are shown. Sections 23, 24 are laterally offset from the longitudinal axis of bus bar 16 being connected thereto by respective joining sections 25, 26.

Center bus bar 15 is disposed behind insulator 14 and is provided with a plurality of integrally formed equally spaced contact sections, only two of which 27, 28 are shown. Sections 27, 28 are disposed in front of bus bar 15, being connected thereto by respective U-shaped joining sections 31, 32 which extend through respective apertures 33, 34 of insulator 19.

Each of the contact sections 17, 18, 23, 24, 27, 28 includes a pair of identical forwardly extending planar blades designated by the respective suffixes "a" and "b" in association with the reference numeral of the contact setion in question. Thus, section 17 includes blades 17a, 17b. All of these blades are disposed in a single row and are disposed in equally spaced parallel planes perpendicular to the longitudinal axis of the row. The center to center distance between adjacent blades is equal to approximately width B of narrow circuit breaker 12.

Contact sections 17, 18, 23, 24, 27, 28 are interleaved in a predetermined manner to form a phased sequenced array. Insulator 19 is provided with barriers in the form of forwardly extending blades 36 interposed between adjacent contact sections and positioned parallel to the blades thereof. Notches 37 in the housings of circuit breakers 11, 12 provide clearances to receive the forward portions of barriers 36 when circuit breakers 11, 12 are connected to bus bars 14–16 (see FIG. 2).

FIG. 2 shows two separate narrow circuit breaker modules 12, 12 energized by having the individual female-type plug-in contacts 42 of the respective modules 12, 12 in operative engagement with an individual plug-in contact blades 18a, 18b. Plug-in contact blades 23a, 23b are shown cooperating with each other to constitute a female type plug-in contact which receives male plug-in contact 41 of wide circuit breaker 11.

It shown now be apparent that the blades of each contact section 17, 18, 23, 24, 27, 28 constitute a single female-type plug-in terminal for a wide circuit breaker 11 or constitute two male side by side type plug-in terminals for two narrow circuit breaker modules 12, 12 each of which is provided with its own female plug-in contact 42 for direct engagement with a panelboard contact blade. It should also be apparent that rejection means (not shown) is provided to prevent a single contact 41 from engaging two blades that are at different potentials. It is noted that the width C of each contact blade (FIG. 3) is sufficient to permit each blade to be engaged by plug-in contacts of two circuit breakers mounted line end to line end.

Figure 5:
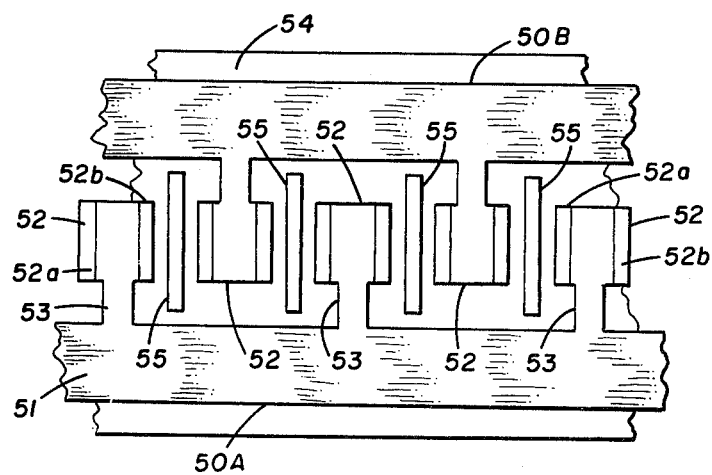
FIG. 5 is a plan view similar to FIG. 1 showing a main conductor assembly for a single phase three wire system.

FIG. 5 shows the teachings of the instant invention adapted to a single phase three wire panelboard. In FIG. 5 conductor units 50A, 50B are of identical construction so that only unit 50A will be described. Unit 50A includes flat bus bar 51 adjacent the forward surface of insulator 54 and a plurality of identical contact sections 52 equally spaced along the length of bus bar 51, laterally offset therefrom, and connected thereto by joining sections 53. Each contact section 52 includes two forwardly extending contact blades 52a, 52b spaced center to center by distance B.

Contact sections 52 of units 50A, 50B are interleaved being separated by forwardly extending barriers 55 formed integrally with insulator 54. It should now be apparent that barriers 55 are essentially the same as barriers 36 and that contact sections 52 are essentially the same as contact section 17.

It should also be apparent that the inslulating elements may be provided with suitable formations to operatively position the conducting elements and that suitable means (not shown) secure the conductive elements in their respective operative positions.

Figure 6:
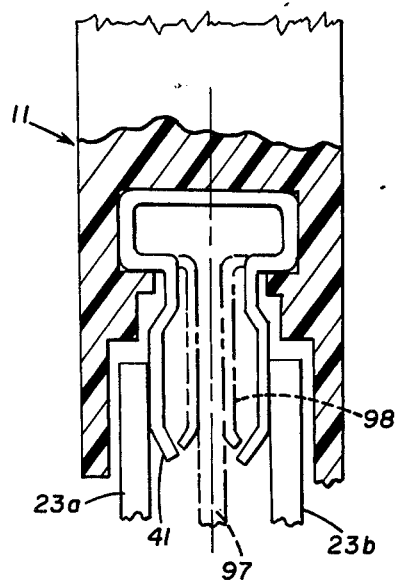
FIG. 6 is an enlarged fragmentary portion of FIG. 2 with a conventional panelboard circuit breaker stab combination superimposed.

With reference to FIG. 6 it is seen that the construction of the housing for wide circuit breaker 11 is such that male-type plug-in contact 41 may be replaced by a conventional female type plug-in line contact 98 which engages both sides of a single stab 97. A conventional panelboard for 1" wide breakers is provided with a row of stabs 97 positioned on centers spaced apart by an inch. Thus, it is seen that a single circuit breaker housing construction may accommodate both types of terminal stabs 41 and 98.

Although a preferred embodiment of this invention has been discribed, many variations and modifications will now be apparent to those skilled in the art, and it is therefore preferred that the instant invention be limited not by the specific disclosure herein, but only by the appending claims.

What is claimed is:

1. An assembly including main conductor means for a panelboard and first and second plug-in type circuit breaker modules connected to said assembly, said first module being of a first width and said second module being of a second width approximately two times the first width; said main conductor means including first and second bus bars; a plurality of first contact sections formed integrally with said first bus bar and a plurality of second contact sections formed integrally with said second bus bar; each of said first and second contact sections including first and second generally planar parallel contact blades spaced by approximately said first width; said blades of said plurality of said first and second contact sections being arranged in a row with the blades being in spaced parallel planes generally perpendicular to the length of said row; said first and second contact sections being interleaved; said first blade of each of said first contact sections being spaced from said second blade of a different one of said contact sections by approximately said first width; each of said blades being constructed to constitute a male plug-in contact to be engaged by a female plug-in contact of a circuit breaker module of said first width; each of said contact sections being constructed so that the first and second blades thereof cooperate to constitute a female contact to receive a male plug-in contact of a circuit breaker module of said second width; said first module including a female plug-in contact having jaws in direct engagement with opposite sides of a first of said blades; said second module including a male plug-in contact having first and second sides in direct engagement with the respective first and second blades of one of said contact sections.

2. An assembly as set forth in claim 1 also including an insulating barrier interposed between said first blades of each of said first contact sections and said second blade of a different one of said second contact sections.

3. An assembly as set forth in claim 1 also including a third bus bar; a plurality of third contact sections formed integrally with said third bus bar; each of said third contact means including first and second generally planar parallel contact blades spaced by approximately said first width and disposed in said row with their planes generally perpendicular to the length of said row; a first and a second of said third contact sections being disposed between one of said first and one of said second contact sections; each of said first and second blades of said third section being spaced from a blade adjacent thereto in another contact section by approximately said first width.

4. An assembly as set forth in claim 3 also including an insulating barrier disposed between each blade of a particular one of said contact sections and the blade adjacent thereto of a different one of said contact sections.

5. An assembly as set forth in claim 4 in which for each of said contact sections said first and second blades thereof cooperate to constitute a female contact to receive a male plug-in contact of a circuit breaker module of said second width.

6. An assembly as set forth in claim 1 in which each of the blades is of sufficient width to the engaged simultaneously by plug-in contacts of two circuit breakers mounted end-to-end.

7. An assembly as set forth in claim 1 in which the first and second blades are the sole portions of said main conductor assembly providing plug-in contact means for load protecting circuit breakers.

* * * * *

UNITED STATES PATENT AND TRADEMARK OFFICE
CERTIFICATE OF CORRECTION

PATENT NO. : 4,157,582
DATED : June 5, 1979
INVENTOR(S) : FELIX E. MYERS

It is certified that error appears in the above-identified patent and that said Letters Patent are hereby corrected as shown below:

Claim 6, column 4, line 55, change "the" to --be--

Signed and Sealed this

Fourteenth Day of October 1980

[SEAL]

Attest:

SIDNEY A. DIAMOND

Attesting Officer

Commissioner of Patents and Trademarks